(12) United States Patent
Kojima

(10) Patent No.: US 10,385,889 B2
(45) Date of Patent: Aug. 20, 2019

(54) CYLINDER DEVICE

(71) Applicant: KOSMEK LTD., Hyogo (JP)

(72) Inventor: Ryota Kojima, Hyogo (JP)

(73) Assignee: KOSMEK LTD., Hyogo (JP)

( * ) Notice: Subject to any disclaimer, the term of this patent is extended or adjusted under 35 U.S.C. 154(b) by 161 days.

(21) Appl. No.: 15/574,586

(22) PCT Filed: Jun. 13, 2016

(86) PCT No.: PCT/JP2016/067561
§ 371 (c)(1),
(2) Date: Nov. 16, 2017

(87) PCT Pub. No.: WO2016/208443
PCT Pub. Date: Dec. 29, 2016

(65) Prior Publication Data
US 2018/0156249 A1    Jun. 7, 2018

(30) Foreign Application Priority Data

Jun. 26, 2015    (JP) .................................. 2015-140846

(51) Int. Cl.
*F15B 15/28* (2006.01)
*B23Q 3/06* (2006.01)
(Continued)

(52) U.S. Cl.
CPC ............ *F15B 15/2807* (2013.01); *B23Q 3/06* (2013.01); *B25B 5/064* (2013.01); *F15B 15/06* (2013.01);
(Continued)

(58) Field of Classification Search
CPC ...... F15B 15/02; F15B 15/148; F15B 15/261; F15B 15/268; F15B 15/2807
See application file for complete search history.

(56) References Cited

U.S. PATENT DOCUMENTS

| 3,661,053 | A | * | 5/1972 | Rich ....................... F01L 25/08 |
| | | | | 200/332.1 |
| 4,024,800 | A | * | 5/1977 | Masclet .................. B64C 25/22 |
| | | | | 244/102 SL |
| 2016/0271758 | A1 | * | 9/2016 | Kawakami .............. B25B 5/062 |

FOREIGN PATENT DOCUMENTS

| JP | 55-155903 A | 12/1980 |
| JP | H2-100844 A | 4/1990 |

(Continued)

OTHER PUBLICATIONS

International Search Report in corresponding International Application No. PCT/JP2016/067561, dated Sep. 6, 2016.

(Continued)

*Primary Examiner* — F Daniel Lopez
*Assistant Examiner* — Matthew Wiblin
(74) *Attorney, Agent, or Firm* — Bacon & Thomas, PLLC

(57) ABSTRACT

A piston body (11) of an advancing-retracting first piston (10) and a force-multiplying second piston (15) are arranged in series in a vertical direction in a housing (1). Force acting on the second piston (15) due to pressurized oil in a lock chamber (16) is multiplied and converted into multiplied upward force via engaging balls (32) of a force multiplier (30). Then, the multiplied upward force is transmitted to an output rod (12) of the first piston (10). At an intermediate part of a first air detection passage (38) for use in detection formed in the housing (1), a first detection valve (40) is provided. When the engaging balls (32) move inward in a radial direction, the first detection valve (40) is closed.

3 Claims, 4 Drawing Sheets

(51) Int. Cl.
*F15B 15/06* (2006.01)
*F15B 15/14* (2006.01)
*F15B 15/22* (2006.01)
*F15B 15/26* (2006.01)
*B25B 5/06* (2006.01)
*F15B 15/20* (2006.01)

(52) U.S. Cl.
CPC ...... *F15B 15/1409* (2013.01); *F15B 15/1447* (2013.01); *F15B 15/204* (2013.01); *F15B 15/22* (2013.01); *F15B 15/261* (2013.01); *F15B 2211/775* (2013.01)

(56) References Cited

FOREIGN PATENT DOCUMENTS

| | | | |
|---|---|---|---|
| JP | 2014-114898 A | 6/2014 | |
| JP | 2014108490 A * | 6/2014 | ............. B25B 5/062 |
| JP | 2014-159868 A | 9/2014 | |
| JP | 2014-238174 A | 12/2014 | |
| JP | 2014-240117 A | 12/2014 | |
| JP | 2015-020221 A | 2/2015 | |
| JP | 2015-113976 A | 6/2015 | |

OTHER PUBLICATIONS

Chinese Office Action in corresponding Chinese Application No. CN 201680036338.X, dated Mar. 28, 2019.
International Preliminary Report on Patentability in corresponding International Application No. PCT/JP2016/067561, dated Dec. 26, 2017.

* cited by examiner

CYLINDER DEVICE

TECHNICAL FIELD

The present invention relates to a cylinder device having a force multiplier, and more specifically, to a technique suitable for detecting a state of operation of the force multiplier provided in the cylinder device.

BACKGROUND ART

Such a type of cylinder device having a force multiplier has been conventionally disclosed in Patent Literature 1 (Japanese Patent Application Publication, Tokukai, No. 2014-240117). This conventional technique is configured as follows.

An advancing-retracting first piston and a force-multiplying second piston are arranged in series in a vertical direction in a housing. Upward force acting on the second piston due to locking pressurized fluid is multiplied and converted into multiplied downward force, and the multiplied downward force is transmitted to an output rod. Further, in an air passage for use in detection formed in an upper wall of the housing, a detection valve is provided. The detection valve includes a detection rod slightly protruding downward from the upper wall. Then, when the second piston rises to a position in the vicinity of an upper limit position beyond a locking area from a release position, the second piston abuts on the detection rod. Subsequently, the second piston pushes up the detection rod from the position in the vicinity of the upper limit position until the detection rod reaches the upper limit position. This opens the detection valve.

CITATION LIST

Patent Literature

[Patent Literature 1] Japanese Patent Application Publication, Tokukai, No. 2014-240117 (Publication Date: Dec. 25, 2014)

SUMMARY OF INVENTION

Technical Problem

The conventional technique has a problem as below.

The above conventional technique is configured such that the detection rod of the detection valve is slightly pushed up by the second piston from the position in the vicinity of the upper limit position to the upper limit position. This makes it possible to reliably detect that the second piston has excessively moved up to the upper limit position beyond the locking area. The conventional technique is excellent in this point.

However, there is a case where it is desired to detect, by use of the detection valve, that the second piston has moved to a position that is not the upper limit position, for example, that the second piston has moved to the locking area that is at an intermediate position in a case where the second piston rises. In such a case, the detection rod of the detection valve needs to be arranged to largely protrude downward from the upper wall to the locking area. Accordingly, after the second piston rises to the locking area and abuts on the detection rod, the second piston pushes up the detection rod for a long distance from the locking area to the upper limit position. It is therefore necessary to provide a space which allows the detection rod to move for the long distance. As a result, an overall dimension of the detection valve becomes large and consequently, an overall dimension of the cylinder device becomes large.

An object of an embodiment of the present invention is to produce a compact cylinder device having a detecting function.

Solution to Problem

In order to solve the above problem, an embodiment of the present invention includes:
  a first piston (10) being an advancing-retracting first piston (10) hermetically inserted into a housing (1) so as to be movable vertically, the first piston (10) including an output rod (12);
  a second piston (15) being a force-multiplying second piston (15) hermetically inserted into the housing (1) so as to be movable vertically, the second piston (15) being hermetically fitted on an outer circumferential part of the output rod (12);
  a force multiplier (30) for multiplying and converting force which acts on the second piston (15) due to locking pressurized fluid and for transmitting multiplied and converted force to the output rod (12), the force multiplier (30) including an engaging ball (32) which is provided between the output rod (12) and the second piston (15) so as to be movable in a radial direction;
  an air detection passage (38) for use in detection being formed in the housing (1); and
  a detection valve (40) provided in the housing (1), the detection valve (40) opening or closing the air detection passage (38) for use in detection when the engaging ball (32) moves a detection rod (50) of the first detection valve (40) in a direction that intersects with the radial direction.

DESCRIPTION OF EMBODIMENTS

Figure 1:
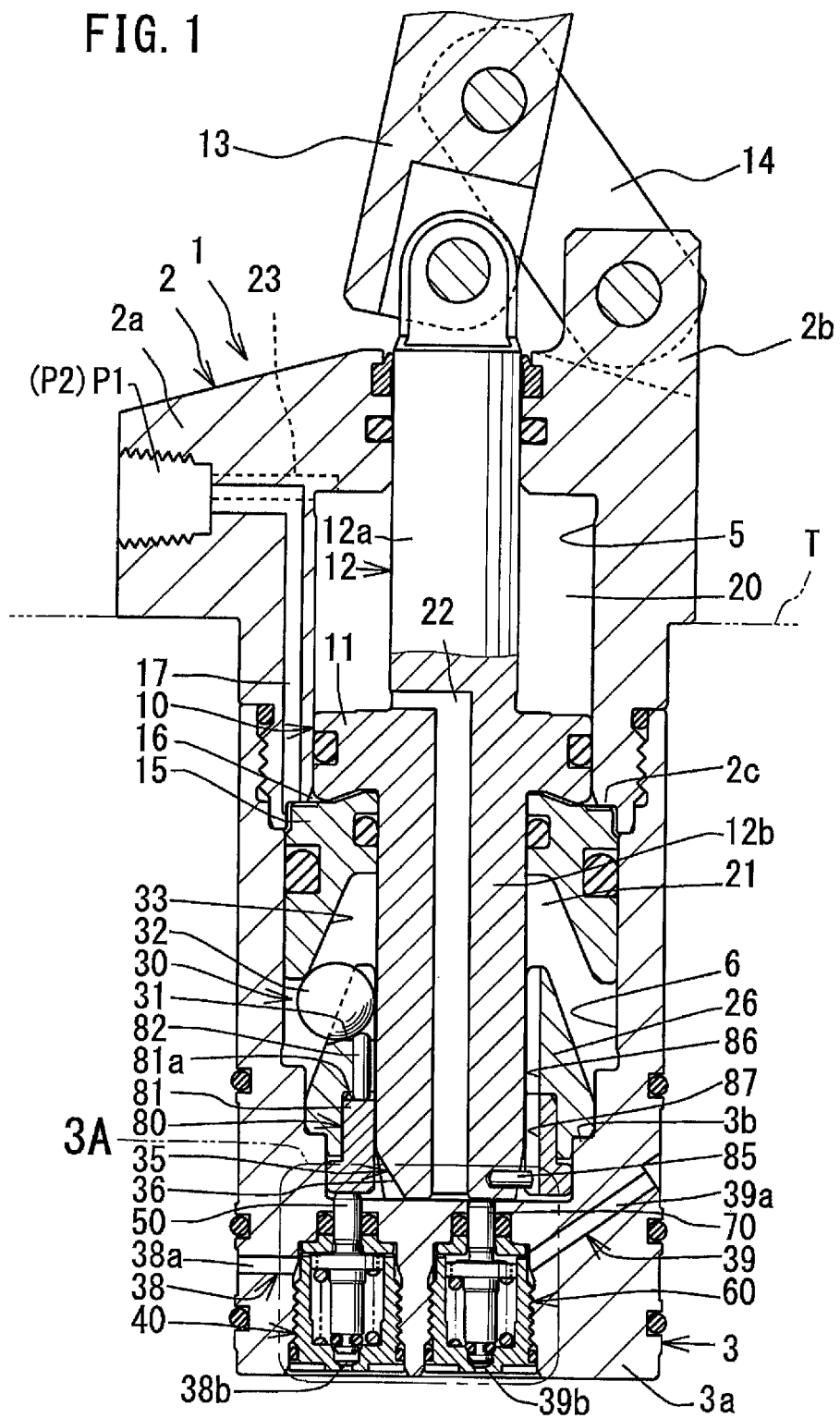
FIG. 1, which illustrates an embodiment of the present invention, is an elevational cross-sectional view illustrating a release state of a cylinder device.

FIGS. 1 to 3B illustrate an embodiment of the present invention. This embodiment describes, as an example, a case where a cylinder device having a force multiplier is applied to a link clamp. First, the following discusses a structure of a cylinder device, with reference to FIG. 1 that illustrates a release state.

A housing 1 is attached to a fixed base T such as a table. The housing 1 includes an upper housing 2 and a lower housing 3, which is provided below the upper housing 2 and screwed to the upper housing 2. An upper wall 2a is formed at an upper part of the upper housing 2. Meanwhile, a lower wall 3a is formed at a lower part of the lower housing 3. An upper cylinder hole 5 is formed inside the upper housing 2. Meanwhile, a lower cylinder hole 6 is formed inside the lower housing 3.

A first piston 10 is hermetically inserted into the upper cylinder hole 5 so as to be movable vertically. The first piston 10 includes a piston body 11 and an output rod 12 that is provided so as to protrude upward and downward from the piston body 11. The output rod 12 includes an upper rod 12a provided so as to protrude upward from the piston body 11, and a lower rod 12b provided so to protrude downward from the piston body 11.

A left end part of a clamp arm 13 is connected pivotably in a vertical plane to an upper end part of the upper rod 12a. The upper housing 2 is provided with a pivotably supporting portion 2b that protrudes upward at a right upper part of the housing 2. A lower end part of a link member 14 is pivotably connected to an upper end part of this pivotably supporting portion 2b. Meanwhile, an intermediate part of the clamp arm 13 in a longitudinal direction of the clamp arm 13 is pivotably connected to an upper end part of the link member 14.

A force-multiplying second piston 15 is hermetically inserted into the lower cylinder hole 6 so as to be movable vertically, and hermetically and movably fitted on an outer circumferential part of the lower rod 12b.

A lock chamber 16 is formed between the piston body 11 of the piston 10 and the second piston 15. Pressurized oil as locking pressurized fluid is supplied and discharged into/from the lock chamber 16 via a lock supply and discharge passage 17 and a lock port P1.

Further, a first release chamber 20 is formed above the piston body 11, while a second release chamber 21 is formed below the second piston 15. Further, the first release chamber 20 and the second release chamber 21 are communicated with each other via a communicating passage 22 that is formed in the upper rod 12a, the piston body 11 and the lower rod 12b. This allows pressurized oil to be supplied and discharged into/from the first release chamber 20 and the second release chamber 21 via a release supply and discharge passage 23 and a release port P2

A step portion 3b is formed at a lower part of the lower cylinder hole 6. This step portion 3b receives an annular receiver sleeve 26 from below. The lower rod 12b is inserted into an inner circumferential hole of the receiver sleeve 26 so as to be movable vertically.

Figure 2:
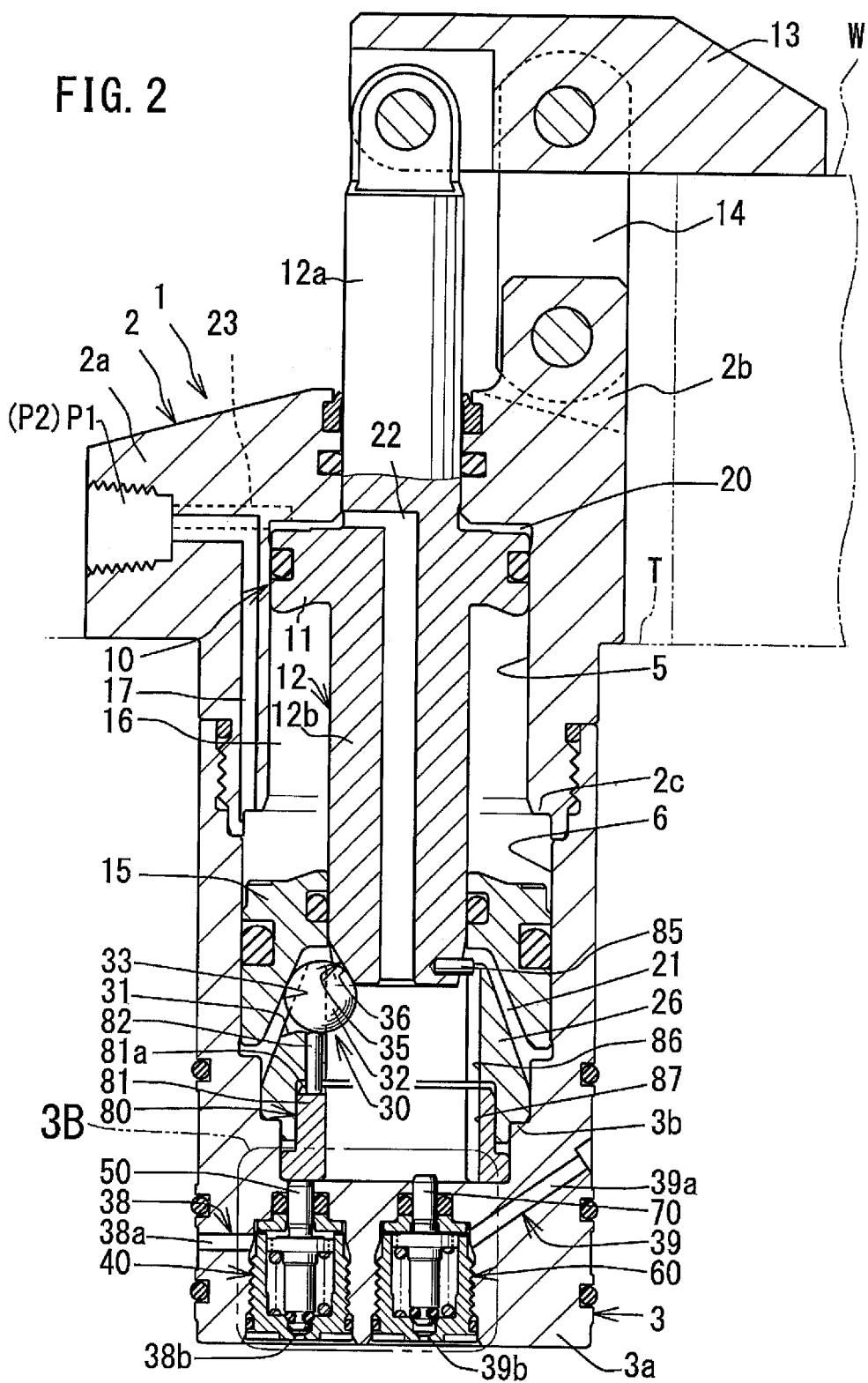
FIG. 2, which is similar to FIG. 1, is a cross-sectional view illustrating a lock state of the cylinder device.

The second release chamber 21 is provided with a force multiplier 30. This force multiplier 30 multiplies and converts downward force acting on the second piston 15 due to the pressurized oil in the lock chamber 16 so that the downward force becomes multiplied upward force, and transmits the multiplied upward force to the lower rod 12b. The force multiplier 30 is configured as follows, as illustrated in FIG. 2.

Guide grooves 31 are formed radially at predetermined intervals in a circumferential direction at an upper part of the receiver sleeve 26. Engaging balls 32 are inserted into the guide grooves 31, respectively, so as to be movable horizontally. A force multiplying portion 33 is formed in an inner circumferential hole of the second piston 15 such that a higher part of the force multiplying portion 33 is closer to the axis of the output rod 12. The engaging balls 32 abut on the force multiplying portion 33. Transmission grooves 35 are formed at predetermined intervals in the circumferential direction at a lower part of the lower rod 12b such that higher parts of the transmission grooves 35 are farther from the axis of the output rod 12. The engaging balls 32 abut on transmitting portions 36 that are formed by surface walls of the transmission grooves 35, respectively.

A first air detection passage (air detection passage) 38 for use in detection is formed in a left part of the lower wall 3a of the lower housing 3. A first detection valve (detection valve) 40 is provided at an intermediate part of the first air detection passage 38. A first supply passage 38a is formed on an upstream side of the first detection valve 40. Meanwhile, a first discharge passage 38b is formed on a downstream side of the first detection valve 40.

Further, a second air detection passage 39 for use in detection is formed in a right part of the lower wall 3a. A second detection valve 60 is provided at an intermediate part of the second air detection passage 39. A second supply passage 39a is formed on an upstream side of the second detection valve 60. Meanwhile, a second discharge passage 39b is formed on a downstream side of the second detection valve 60.

Figure 3A:
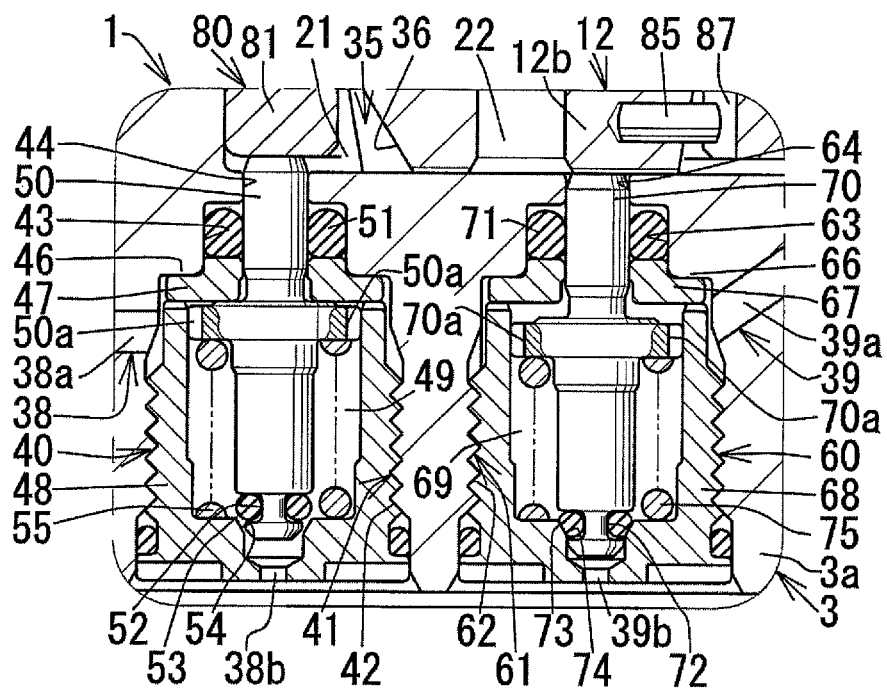
FIG. 3A is a partial diagrammatic view in which a portion 3A illustrated in FIG. 1 is enlarged.
Figure 3B:
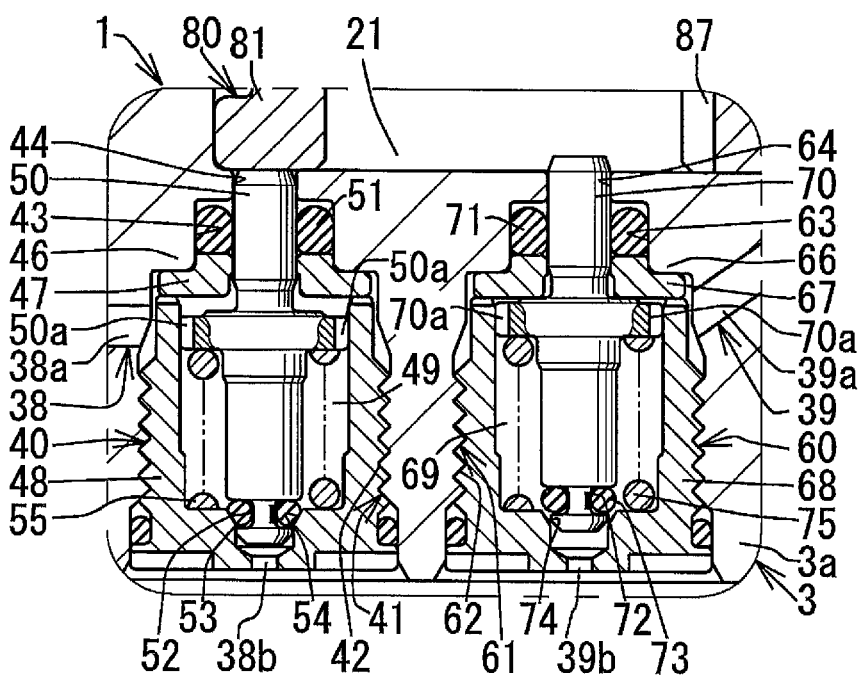
FIG. 3B is a partial diagrammatic view in which a portion 3B illustrated in FIG. 2 is enlarged.

The first detection valve 40 is configured as follows, as illustrated in FIG. 3A.

The lower wall 3a is provided with a first mounting hole 41 which is formed in a vertical direction so as to communicate with the second release chamber 21. The first mounting hole 41 includes a female screw hole 42, a medium-diameter hole 43 and a small-diameter hole 44, which are formed from below in this order. A first annular retainer 47 is fixed, by a first casing 48 screwed to the female screw hole 42, to a step portion 46 formed between the first annular retainer 42 and the medium-diameter hole 43. A valve chamber 49 is formed inside the first casing 48. The first supply passage 38a is communicated with the valve chamber 49. Further, a first detection rod (detection rod) 50 is inserted into the valve chamber 49. An upper end part of the first detection rod 50 is inserted into the small-diameter hole 44 via a sealing member 51 so as to be movable vertically, and at the same time protrudes into the second release chamber 21. A large-diameter portion of the first detection rod 50 is formed at an intermediate-height part of the first detection rod 50 and is guided vertically along an inner circumferential wall of the valve chamber 49. Grooves 50a are formed in the vertical direction on the large-diameter portion, at predetermined intervals in a circumferential direction. Further, a groove 52 is formed along the circumferential direction at a lower part of the first detection rod 50. An O-ring 53 serving as a first valving element is mounted in the groove 52. The first discharge passage 38b is communicated with the valve chamber 49, and a valve seat 54 is formed at a circumferential edge part of the first discharge passage 38b. A compression spring 55 is mounted between the lower part of the first casing 48 and the large-diameter portion of the first detection rod 50. The first detection rod 50 is biased upward by the compression spring 55.

The second detection valve 60 has the same structure as the first detection valve 40 and is configured as follows. The lower wall 3a is provided with a second mounting hole 61 which is formed in the vertical direction so as to communicate with the second release chamber 21. A first annular retainer 67 is fixed to a step portion 66 by a second casing 68 that is screwed to a female screw hole 62 of the second mounting hole 61. A valve chamber 69 is formed inside the second casing 68. The first supply passage 38a is communicated with the valve chamber 69. Further, a second detection rod 70 is inserted into the valve chamber 69. An upper end part of the second detection rod 70 is inserted into a small-diameter hole 64 of the second mounting hole 61 via a sealing member 71 so as to be movable vertically, and at the same time protrudes into the second release chamber 21.

A large-diameter portion of the second detection rod 70 is formed at an intermediate-height part of the second detection rod 70 and is guided vertically along an inner circumferential wall of the valve chamber 69. Grooves 70*a* are formed in the vertical direction on the large-diameter portion, at predetermined intervals in a circumferential direction. Further, a groove 72 is formed along the circumferential direction at a lower part of the second detection rod 70. An O-ring 73 serving as a second valving element is mounted in the groove 72. The second discharge passage 39*b* is communicated with the valve chamber 69, and a valve seat 74 is formed at a circumferential edge part of the second discharge passage 39*b*. A compression spring 75 is mounted between the lower part of the second casing 68 and the large-diameter portion of the second detection rod 70. The second detection rod 70 is biased upward by the compression spring 75.

An operation object member 80 is inserted between the upper end part of the first detection rod 50 and the engaging balls 32 so as to be movable vertically. The operation object member 80 includes an operation object ring 81 and an operation object pin 82 which are provided in this order from below. The operation object ring 81 is inserted in a space formed between the lower wall 3*a* and the receiver sleeve 26 so as to be movable vertically. At the same time, the operation object ring 81 abuts on a top surface of the first detection rod 50 of the first detection valve 40. The operation object pin 82 is inserted into a mounting hole formed in the receiver sleeve 26 so as to be movable vertically. In this configuration, when a lower end part of the operation object pin 82 is inserted into a depression 81*a* formed at an upper part of the operation object ring 81, the receiver sleeve 26 is identical in phase in the circumferential direction to the operation object ring 81. The upper end part of the operation object pin 82 is configured to protrude upward from each of the guide grooves 31 of the receiver sleeve 26 so as to be able to abut on a corresponding engaging ball 32.

Further, a pin 85 is provided so as to protrude outward in the radial direction from the outer circumferential part of the lower rod 12*b*. Furthermore, a guide groove 86 is formed in the vertical direction in the receiver sleeve 26. In addition, a guide groove 87 is formed in the vertical direction in the operation object ring 81 so as to be continuous with the guide groove 86. This allows the pin 85 to be guided in the vertical direction along the guide grooves 86 and 87. This results in a configuration in which the first piston 10 is identical in phase in the circumferential direction to the receiver sleeve 26. Further, in the configuration, the first piston 10 is identical in phase in the circumferential direction to the operation object ring 81.

The cylinder device operates as follows, as illustrated in FIGS. 1 to 3B.

In a release state illustrated in FIG. 1 (and FIG. 3A), pressurized oil is discharged from the lock chamber 16, and at the same time, pressurized oil is supplied to the first release chamber 20 and the second release chamber 21. This causes the first piston 10 to move downward due to the pressurized oil in the first release chamber 20, so that the lower end part of the lower rod 12*b* is received from below by the lower wall 3*b*. Meanwhile, the second piston 15 is moved upward to an upper position due to the pressurized oil in the second release chamber 21. Then, the second piston 15 is received from above by a step portion 2*c* formed at a lower end part of the upper cylinder hole 5. Further, the engaging balls 32 are moved outward in the radial direction by the outer circumferential part of the lower rod 12*b*.

Meanwhile, in the release state illustrated in FIG. 3A, the compression spring 55 of the first detection valve 40 causes, via the first detection rod 50 and the operation object ring 81, the operation object pin 82 to move upward. Accordingly, the O-ring 53 of the first detection rod 50 is spaced apart from the valve seat 54, so that the first detection valve 40 is opened.

Further, the lower rod 12*b* moves the second detection rod 70 downward against the compression spring 75 of the second detection valve 60. Accordingly, the O-ring 73 of the second detection rod 70 is sealingly engaged with the valve seat 74, so that the second detection valve 60 is closed.

In lock driving from the release state illustrated in FIG. 1 (and FIG. 3A) to a lock state illustrated in FIG. 2 (and FIG. 3B), the pressurized oil is discharged from the first release chamber 20 and the second release chamber 21 in the release state, and at the same time, the pressurized oil is supplied to the lock chamber 16 in the release state.

Then, first, as the pressurized oil in the lock chamber 16 causes the first piston 10 to move upward with a low load, the lower rod 12*b* is also moved upward. Subsequently, the second detection rod 70 is moved upward by the compression spring 75, so that the second detection valve 60 is opened. Further, the engaging balls 32 are supported from below by the guide grooves 31 of the receiver sleeve 26, and are also supported from an inner side in the radial direction by the outer circumferential part of the lower rod 12*b*. Accordingly, the second piston 15 is held at the upper position by the engaging balls 32.

Next, when the lower rod 12*b* is moved up until the transmitting portions 36 of the lower rod 12*b* reach a position at the height of the engaging balls 32, the engaging balls 32 are allowed to move inward in the radial direction. Subsequently, as the second piston 15 moves down, the second piston 15 pushes the engaging balls 32 inward in the radial direction. This causes the force multiplier 30 to start force multiplication driving. Then, the engaging balls 32 causes, via the operation object pin 82 and the operation object ring 81, the first detection rod 50 of the first detection valve 40 to move downward.

Finally, when a right end part of the clamp arm 13 pushes a clamped object W as illustrated in FIG. 2, the first piston 10 stops at an upper position and at the same time, the second piston 15 stops at a lower position. In this case, the engaging balls 32 cause, via the operation object pin 82 and the operation object ring 81, the first detection rod 50 to move downward, so that the O-ring 53 of the first detection rod 50 abuts on the valve seat 54. This closes the first detection valve 40. As a result, a pressure sensor (not illustrated) detects an increased pressure of the first air supply passage 38*a*. It is consequently detected that the force multiplier 30 is carrying out force multiplication driving.

In release driving from the lock state illustrated in FIG. 2 (FIG. 3B) to the release state illustrated in FIG. 1 (FIG. 3A), the pressurized oil is discharged from the lock chamber 16 in the lock state and at the same time, the pressurized oil is supplied to the first release chamber 20 and the second release chamber 21 in the lock state.

Then, first, when the pressurized oil in the second release chamber 21 causes the second piston 15 to move upward. This allows the engaging balls 32 to move outward in the radial direction.

Next, when the pressurized oil in the first release chamber 20 causes the first piston 10 to move downward, the transmitting portions 36 of the lower rod 12*b* move the engaging balls 32 outward in the radial direction. Then, the compression spring 55 of the first detection valve 40 causes the first detection rod 50 of the first detection valve 40, the operation object ring 81, and the operation object pin 82 to move upward. Accordingly, the O-ring 53 of the first detection valve 40 is spaced apart from the valve seat 54, so that the first detection valve 40 is opened. As a result, the pressure sensor (not illustrated) detects a decreased pressure of the first air supply passage 38a.

Finally, the second piston 15 is received from above by the step portion 2c of the upper housing 2. Further, the lower rod 12b moves the detection rod 70 of the second detection valve 60 to a lower limit position. At the same time, the lower rod 12b is received by the lower wall 3a. This closes the second detection valve 60. As a result, a pressure sensor (not illustrated) detects an increased pressure of the second supply passage 39a, and it is thereby detected by the second detection valve 60 that the lower rod 12b has moved to the lower limit position.

The above embodiment has the following effects.

In lock driving of the cylinder device, the second piston 15 moves the engaging balls 32 inward in the radial direction, so that the engaging balls 32 move the first detection rod 50 downward. Accordingly, a distance that the first detection rod 50 moves can be significantly shorter than a distance that a first detection rod of a conventional technique is moved downward directly by a second piston. Accordingly, the valve chamber 49 allowing for move of the first detection rod 50 can be fabricated in a small size. As a result, an overall dimension of the first detection valve 40 can be reduced. This consequently makes it possible to produce a compact cylinder device having the first detection valve 40.

The above embodiment can be modified as follows.

The pressurized fluid may be another liquid or a gas such as compressed air, in place of the pressurized oil described above as an example.

The first detection valve 40 and the second detection valve 60 may be provided in the upper wall 2a instead of in the lower wall 3a. Further, the first detection valve 40 and the second detection valve 60 may be inclined instead of being vertically arranged.

Further, it is possible to use, in place of each of the first detection valve 40 and the second detection valve 60, an electrical switch (e.g., a contact limit switch or a non-contact switch such as a proximity switch) for detection of movement of the engaging balls 32. Furthermore, instead of an electrical switch, an electronic switch using a semiconductor element or the like may be used.

Figure 4:
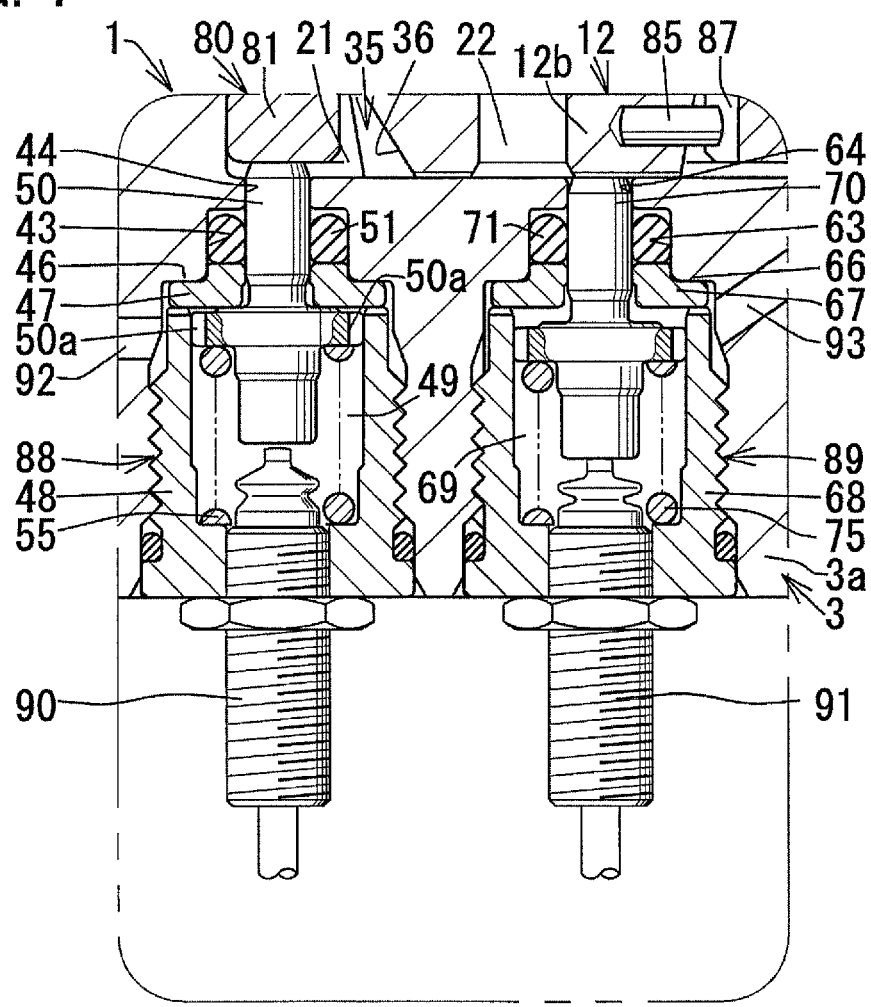
FIG. 4, which illustrates another configuration of the portion 3A illustrated in FIG. 1, is a partial diagrammatic view in which the another configuration of the portion 3A is enlarged.

FIG. 4, which illustrates another configuration of the portion 3A illustrated in FIG. 1, is a partial diagrammatic view in which the another configuration of the portion 3A is enlarged. Elements which are the same as those described above with reference to FIG. 3A are given the same reference signs and detailed explanations thereof will not be repeated.

A pair of contact switches 88 and 89 may be provided in place of the first detection valve 40 and the second detection valve 60 illustrated in FIG. 3A. The switch 88 (one of the switches) includes a switch terminal 90 and a first detection rod 50. The switch 89 (the other one of the switches) includes a switch terminal 91 and a second detection rod 70. The switch terminal 90 is provided below the first detection rod 50. The switch terminal 91 is provided below the second detection rod 70. In the left part of the lower wall 3a of the lower housing 3, a breathing hole 92 is formed. Further, in the right part of the lower wall 3a, another breathing hole 93 is formed.

In a case where a cylinder device includes the switch 88 including the first detection rod 50 and the switch 89 including the second detection rod 70 in place of the first detection valve 40 and the second detection valve 60, the cylinder device operates as follows.

In a release state illustrated in FIG. 4, the compression spring 55 causes, via the first detection rod 50 and the operation object ring 81, the operation object pin 82 to move upward. Accordingly, a lower end of the first detection rod 50 is spaced apart from an upper end of the switch terminal 90.

Meanwhile, the lower rod 12b moves the second detection rod 70 downward against the compression spring 75. Accordingly, a lower end of the second detection rod 70 comes in contact with an upper end of the switch terminal 91.

In lock driving from the release state illustrated in FIG. 1 (and FIG. 4) to the lock state illustrated in FIG. 2, the pressurized oil is discharged from the first release chamber 20 and the second release chamber 21 in the release state, and at the same time, the pressurized oil is supplied to the lock chamber 16 in the release state.

Then, first, as the pressurized oil in the lock chamber 16 causes the first piston 10 to move upward with a low load, the lower rod 12b is also moved upward. Subsequently, the second detection rod 70 is moved upward by the compression spring 75, so that the lower end of the second detection rod 70 is moved apart from the upper end of the switch terminal 91.

Further, the engaging balls 32 are supported from below by the guide grooves 31 of the receiver sleeve 26, and are also supported from an inner side in the radial direction by the outer circumferential part of the lower rod 12b. Accordingly, the second piston 15 is held at the upper position by the engaging balls 32.

Next, when the lower rod 12b is moved up until the transmitting portions 36 of the lower rod 12b reach a position at the height of the engaging balls 32, the engaging balls 32 are allowed to move inward in the radial direction. Subsequently, when the second piston 15 moves down, the second piston 15 pushes the engaging balls 32 inward in the radial direction. This causes the force multiplier 30 to start force multiplication driving. Then, the engaging balls 32 causes, via the operation object pin 82 and the operation object ring 81, the first detection rod 50 to move downward.

Finally, when a right end part of the clamp arm 13 pushes a clamped object W, the first piston 10 stops at the upper position while the second piston 15 stops at the lower position. In this case, the engaging balls 32, causes via the operation object pin 82 and the operation object ring 81, the first detection rod 50 to move downward, so that the lower end of the first detection rod 50 abuts on the upper end of the switch terminal 90. This turns on the switch 88 of the switch terminal 90. As a result, it is electrically or electronically detected that the engaging balls 32 have moved the first detection rod 50 in a direction that intersects with the radial direction. It is consequently detected that the force multiplier 30 is carrying out force multiplication driving.

In lock driving of the first piston 10, after the first piston 10 in the release state is driven upward with a low load, force multiplication driving is carried out. In such a case, alternatively, force multiplication driving may be carried out during a period from the release state to the lock state.

The force multiplier 30 multiplies and converts downward force acting on the second piston 15 due to the pressurized oil in the lock chamber 16 so that the downward force becomes multiplied upward force, and transmits the multiplied upward force to the output rod 12. The force multiplier 30 may alternatively multiply and convert upward force acting on the second piston 15 due to the pressurized oil in the lock chamber 16 so that the upward force becomes multiplied downward force, and may transmit the multiplied downward force to the output rod 12.

The operation object member 80 is provided between the engaging balls 32 and the first detection valve 40 so as to be movable vertically. The operation object member 80 may be alternatively provided so as to be movable from the vertical direction to a tilted direction.

The operation object ring 81 and the operation object pin 82 of the operation object member 80 may be integrally formed instead of being separately formed.

Any of various other changes can be certainly made within the scope that a person skilled in the art can expect.

(Aspect of Present Invention)

In order to achieve the above object, in an aspect of the present invention, a cylinder device is configured, for example, as illustrated in FIGS. 1 to 3B.

An advancing-retracting first piston 10 is hermetically inserted into a housing 1 so as to be movable vertically. A first piston 10 includes an output rod 12. A force-multiplying second piston 15 is hermetically inserted into the housing 1 so as to be movable vertically. This force-multiplying second piston 15 is hermetically fitted on an outer circumferential part of the output rod 12. A force multiplier 30 multiplies and converts force acting on the second piston 15 due to locking pressurized fluid in the lock chamber 16, and transmits multiplied and converted force to the output rod 12. The force multiplier 30 includes engaging balls 32 which are provided between the output rod 12 and the second piston 15 so as to be movable in a radial direction. Further, a first air detection passage 38 for use in detection is formed in the housing 1. The housing 1 is provided with a first detection valve 40. The engaging balls 32 move the first detection rod 50 of the first detection valve 40 in a direction that intersects with the radial direction. As a result, the first detection valve 40 opens/closes the first air detection passage 38 for use in detection.

The above aspect of the present invention has the following effects.

In lock driving of the cylinder device, the second piston moves the engaging balls in the radial direction, so that the engaging balls move the first detection rod in the direction that intersects with the radial direction. Accordingly, a distance that the detection rod moves can be significantly shorter than a distance that a detection rod of a conventional technique is moved directly by a second piston in a direction in which the second piston moves. Therefore, a space inside a detection valve, which space allows for move of the detection rod, can be made in a smaller size. As a result, an overall dimension of the detection valve can be reduced. This consequently makes it possible to produce a compact cylinder device having the detection valve.

It is preferable to add the following configurations (1) and (2) to the aspect of the present invention.

(1) An operation object member 80 is provided between the engaging balls 32 and the first detection valve 40 so as to be movable in a direction that intersects with the radial direction. When the engaging balls 32 move in the radial direction, the engaging balls 32 causes, via the operation object member 80, the first detection rod 50 to move in the direction that intersects with the radial direction.

In this case, even if the detection rod is provided at a position apart from the engaging balls, the engaging balls can reliably cause, via the operation object member, the detection rod to move.

(2) Instead of providing the first air detection passage 38 and the first detection valve 40 in the housing 1, a switch 88 including a switch terminal 90 and a first detection rod 50 is provided in the housing 1. The switch electrically or electronically detects that the engaging balls 32 have moved the first detection rod 50 of the switch in the direction that intersects with the radial direction.

In this case, in lock driving of the cylinder device, the second piston moves the engaging balls in the radial direction, so that the engaging balls move the detection rod in the direction that intersects with the radial direction. Accordingly, a distance that the detection rod moves can be significantly shorter than a distance that a detection rod of a conventional technique is moved directly by a second piston in a direction in which the second piston moves. Therefore, a space inside the switch, which space allows for move of the detection rod, can be made in a smaller size. As a result, an overall dimension of the switch can be reduced. This consequently makes it possible to produce a compact cylinder device having the detection valve.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

Reference Signs List

1: housing, 10: first piston, 12: output rod, 15: second piston, 30: force multiplier, 32: engaging ball, 38: first air detection passage (air detection passage), 40: first detection valve (detection valve), 50: first detection rod (detection rod, switch), 80: operation object member, 88: switch, and 90: switch terminal.

The invention claimed is:
1. A cylinder device comprising:
a first piston (10) being an advancing-retracting first piston (10) hermetically inserted into a housing (1) so as to be movable vertically, the first piston (10) including an output rod (12);
a second piston (15) being a force-multiplying second piston (15) hermetically inserted into the housing (1) so as to be movable vertically, the second piston (15) being hermetically fitted on an outer circumferential part of the output rod (12);
a force multiplier (30) for multiplying and converting force which acts on the second piston (15) due to locking pressurized fluid and for transmitting multiplied and converted force to the output rod (12), the force multiplier (30) including an engaging ball (32) which is provided between the output rod (12) and the second piston (15) so as to be movable in a radial direction;
an air detection passage (38) for use in detection being formed in the housing (1); and
a detection valve (40) provided in the housing (1), the detection valve (40) opening or closing the air detection passage (38) for use in detection when the engaging ball (32) moves a detection rod (50) of the first detection valve (40) in a direction that intersects with the radial direction.
2. The cylinder device as set forth in claim 1, further comprising:

an operation object member (80) provided between the engaging ball (32) and the detection rod (50) so as to be movable in the direction that intersects with the radial direction, the engaging ball (32) causing, via the operation object member (80), the detection rod (50) to move in the direction that intersects with the radial direction, in a case where the engaging ball (32) moves in the radial direction.

3. A cylinder device comprising:

a first piston (10) being an advancing-retracting first piston (10) hermetically inserted into a housing (1) so as to be movable vertically, the first piston (10) including an output rod (12);

a second piston (15) being a force-multiplying second piston (15) hermetically inserted into the housing (1) so as to be movable vertically, the second piston (15) being hermetically fitted on an outer circumferential part of the output rod (12);

a force multiplier (30) for multiplying and converting force which acts on the second piston (15) due to locking pressurized fluid and for transmitting multiplied and converted force to the output rod (12), the force multiplier (30) including an engaging ball (32) which is provided between the output rod (12) and the second piston (15) so as to be movable in a radial direction;

a switch (88) including a detection rod (50), the switch (80) electrically or electronically detecting that the engaging ball (32) has moved the detection rod (50) of the switch (88) in a direction that intersects with the radial direction.

* * * * *